United States Patent
Abbas et al.

(10) Patent No.: US 10,155,216 B1
(45) Date of Patent: *Dec. 18, 2018

(54) METHOD FOR REMOVING CYCLIC HYRDROCARBONS FROM AN AQUEOUS SOLUTION USING AN ACTIVE ADSORPTIVE NANOCOMPOSITE

(71) Applicant: KING FAHD UNIVERSITY OF PETROLEUM AND MINERALS, Dhahran (SA)

(72) Inventors: Aamir Abbas, Dhahran (SA); Basim Ahmed Abussaud, Dhahran (SA)

(73) Assignee: King Fadh University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/057,095

(22) Filed: Aug. 7, 2018

Related U.S. Application Data (63) Continuation of application No. 14/963,777, filed on Dec. 9, 2015, now Pat. No. 10,076,741.

(51) Int. Cl.
  *C02F 1/28* (2006.01)
  *B01J 20/20* (2006.01)
  *B01J 20/30* (2006.01)
  *C02F 101/32* (2006.01)
  *C02F 101/36* (2006.01)

(52) U.S. Cl.
  CPC ......... B01J 20/205 (2013.01); B01J 20/3078 (2013.01); C02F 1/288 (2013.01); C02F 1/281 (2013.01); C02F 1/283 (2013.01); C02F 2101/32 (2013.01); C02F 2101/322 (2013.01); C02F 2101/36 (2013.01); C02F 2305/08 (2013.01)

(58) Field of Classification Search
  CPC ...... B01J 20/205; B01J 20/3078; C02F 1/288; C02F 1/283; C02F 1/281; C02F 2101/32; C02F 2305/08; C02F 2101/322
  See application file for complete search history.

(56) References Cited

U.S. PATENT DOCUMENTS

| | | | |
|---|---|---|---|
| 9,988,286 B2 * | 6/2018 | Atieh | C02F 1/288 |
| 10,076,741 B2 * | 9/2018 | Abbas | B01J 20/205 |
| 2010/0307983 A1 | 12/2010 | Viswanathan | |

(Continued)

FOREIGN PATENT DOCUMENTS

| CN | 102151549 A | 8/2011 |
|---|---|---|
| CN | 102513060 A | 6/2012 |

OTHER PUBLICATIONS

K. Ulucan, et al., "Disinfection By-Products Removal by Nanoparticles Sintered in Zeolite", Journal of Clean Energy Technologies, vol. 1, No. 2, Apr. 2013, pp. 120-123.

(Continued)

*Primary Examiner* — Matthew O Savage
(74) *Attorney, Agent, or Firm* — Oblon, McClelland, Maier & Neustadt, L.L.P.

(57) ABSTRACT

The removal of cyclic hydrocarbons from water sources and systems using an active adsorptive nanocomposite comprising multi-walled carbon nanotubes impregnated with metal oxide nanoparticles on the surface of and/or within the carbon nanotubes. A process for producing the active adsorptive nanocomposite is also provided.

8 Claims, 9 Drawing Sheets

(56) References Cited

U.S. PATENT DOCUMENTS

2013/0015122 A1  1/2013  Awadh
2017/0057839 A1  3/2017  Atieh

OTHER PUBLICATIONS

Bina et al, Water and Wastewater Treatment from BTEX by Carbon Nanotubes and Nano-Fe, Nov. 2014, Water Resources, vol. 41, No. 6, pp. 719-727.
Gupta et al, Synthesis of Carbon Nanotube-Metal Oxide Composites; Adsorption and Photo-degradation, Jul. 2011, [Retrieved on Mar. 27, 2018]. Retrieved from the internet: <https://www.intechopen.com/books/carbon-nanotubes-from-research-toapplications/syntheses-of-carbon-nanotube-metal-oxides-composites-adsorption-and-photo-degradation>.

* cited by examiner

METHOD FOR REMOVING CYCLIC HYRDROCARBONS FROM AN AQUEOUS SOLUTION USING AN ACTIVE ADSORPTIVE NANOCOMPOSITE

CROSS-REFERENCE TO RELATED APPLICATIONS

The present application is a Continuation of Ser. No. 14/963,777, now allowed, having a filing date of Dec. 9, 2015.

BACKGROUND OF THE INVENTION

Technical Field

The present disclosure relates to a method for the removal of cyclic hydrocarbons from water sources and systems using an active adsorptive nanocomposite, and a process for synthesizing the active adsorptive nanocomposite.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Toluene and para-xylene are established cyclic hydrocarbons contaminants in water sources. These compounds are classified as flammable, toxic, carcinogenic and/or mutagenic [W. J. Deutsch and R. Siegel, *Groundwater Geochemistry: Fundamentals and Applications to Contamination*. CRC Press, 1997, p. 232; and C. Kent, *Basics of Toxicology*, vol. 13. John Wiley & Sons, 1998, p. 194.—each incorporated herein by reference in its entirety]. Thus, their presence in aqueous solution is a significant environmental concern, even at low concentrations. The health effects these pollutants cause in humans include disturbance of the kidney, liver and blood systems, skin and sensory irritation, respiratory problems, cancer, leukemia, and central nervous system depression. As a result of these health concerns, the U.S. EPA has set a maximum contaminant level of 10 mg/L for xylene in drinking water and the U.S. Public Health Service has recommended no more than 1 mg/L of toluene in water for lifetime exposure.

These compounds are widely used in several chemical production and manufacturing processes including petroleum refiners, as well as the polymer, plastic and paint industries as solvent, a natural fraction of petroleum and as precursors for the manufacturing of different chemicals. Water draining from these industries is highly contaminated with toluene and para-xylene and the pollutants must be removed before water is discharged from any of these industrial facilities [J. A. Kent, Kent and Riegel's *Handbook of Industrial Chemistry and Biotechnology: Vol.* 1. Springer Science & Business Media, 2010, p. 391; and John J. McKetta Jr, *Encyclopedia of Chemical Processing and Design: Volume 67-Water and Wastewater Treatment: Protective Coating Systems to Zeolite.* CRC Press, 1999, p. 289.—each incorporated herein by reference in its entirety]. Further, the pollutants are frequently found in groundwater due to inadvertent spills during production and/or transportation, leaks in underground storage tanks and pipelines, leaching from landfills and improper waste disposal practices. These pollutants migrate easily in the water system, with little or no tendency of being confined near the origin of contamination.

There have been many studies aimed at the removal of cyclic hydrocarbons such as benzene from water. The reported remediation methods include wet air oxidation [B. A. Abussaud, N. Ulkem, D. Berk, and G. J. Kubes, "Wet Air Oxidation of Benzene," *Ind. Eng. Chem. Res.*, vol. 47, no. 514, pp. 4325-4331, 2008.—incorporated herein by reference in its entirety], photo catalytic degradation [M. Bahmani, V. Bitarafhaghighi, K. Badr, P. Keshavarz, and D. Mowla, "The photocatalytic degradation and kinetic analysis of BTEX components in polluted wastewater by UV/$H_2O_2$-based advanced oxidation," *Desalin. Water Treat.*, vol. 52, no. 16-18, pp. 3054-3062, May 2013; and M. N. Chong, B. Jin, C. W. K. Chow, and C. Saint, "Recent developments in photocatalytic water treatment technology: a review.," *Water Res.*, vol. 44, no. 10, pp. 2997-3027, May 2010.—each incorporated herein by reference in its entirety], and adsorption using various materials [I. Ali and V. K. Gupta, "Advances in water treatment by adsorption technology.," *Nat. Protoc.*, vol. 1, no. 6, pp. 2661-7, January 2006.—incorporated herein by reference in its entirety]. However, each technique is characterized by its inherent limitations, which create the continuous need for improvements in methods for the specific removal of toluene and para-xylene from contaminated water sources.

Adsorption has become one of the most promising and increasingly practiced industrial techniques for removing cyclic hydrocarbons such as para-xylene, and toluene from water using such varied absorbents as sand, peat and activated carbon [Y. Kalmykova, N. Moona, A.-M. Strömvall, and K. Björklund, "Sorption and degradation of petroleum hydrocarbons, polycyclic aromatic hydrocarbons, alkylphenols, bisphenol A and phthalates in landfill leachate using sand, activated carbon and peat filters.," *Water Res.*, vol. 56, no. 0, pp. 246-57, June 2014; and N. Wibowo, L. Setyadhi, D. Wibowo, J. Setiawan, and S. Ismadji, "Adsorption of benzene and toluene from aqueous solutions onto activated carbon and its acid and heat treated forms: influence of surface chemistry on adsorption.," *J. Hazard. Mater.*, vol. 146, no. 1-2, pp. 237-42, July 2007; and C. L. Mangun, Z. Yue, J. Economy, S. Maloney, P. Kemme, and D. Cropek, "Adsorption of Organic Contaminants from Water Using Tailored ACFs," no. June 1996, pp. 2356-2360, 2001.—each incorporated herein by reference in its entirety].

Carbon nanotubes (CNTs) have attracted great interest as adsorbents because of their unique chemical structure and intriguing electrical, mechanical and physical properties facilitating the adsorption of different chemicals including organic, inorganic and biological materials [W. Chen, L. Duan, and D. Zhu, "Adsorption of Polar and Nonpolar Organic Chemicals to Carbon Nanotubes," *Environ. Sci. Technol.*, vol. 41, no. 24, pp. 8295-8300, December 2007; and V. K. Gupta, S. Agarwal, and T. a Saleh, "Chromium removal by combining the magnetic properties of iron oxide with adsorption properties of carbon nanotubes.," *Water Res.*, vol. 45, no. 6, pp. 2207-12, March 2011.—each incorporated herein by reference in its entirety]. These carbon nanotubes have high surface areas, are easily modified on their surface to aid adsorption, and are especially well-suited to waste water treatment [0. G. Apul and T. Karanfil, "Adsorption of Synthetic Organic Contaminants by Carbon Nanotubes: A Critical Review," *Water Res.*, vol. 68, pp. 34-55, October 2014; and X. Qu, P. J. J. Alvarez, and Q. Li, "Applications of nanotechnology in water and wastewater treatment.," *Water Res.*, vol. 47, no. 12, pp. 3931-3946, August 2013; and X. Liu, M. Wang, S. Zhang, and B. Pan, "Application potential of carbon nanotubes in water treatment: A review," *J. Environ. Sci.*, vol. 25, no. 7, pp. 1263-1280, July 2013.—each incorporated herein by reference in its entirety].

Despite many studies indicating that CNTs have a high affinity for adsorbing organic chemicals and the potential for developing carbon nanotubes for cyclic hydrocarbon water treatment and removal [C.-J. M. Chin, M.-W. Shih, and H.-J. Tsai, "Adsorption of nonpolar benzene derivatives on single-walled carbon nanotubes,"*Appl. Surf. Sci.*, vol. 256, no. 20, pp. 6035-6039, August 2010; and F. Tournus and J.-C. Charlier, "Ab initio study of benzene adsorption on carbon nanotubes,"*Phys. Rev. B*, vol. 71, no. 16, p. 165421, April 2005; and Y. Liu, J. Zhang, X. Chen, J. Zheng, G. Wang, and G. Liang, "Insights into the adsorption of simple benzene derivatives on carbon nanotubes," *RSC Adv.*, vol. 4, no. 101, pp. 58036-58046, October 2014—each incorporated herein by reference in its entirety] there remains many possibilities for developing different types of carbon nanotubes with different morphologies [S. Iijima, "Helical microtubules of graphitic carbon," *Nature*, vol. 354, no. 6348, pp. 56-58, 1991.—incorporated herein by reference in its entirety] and functionalization for enhancing their affinity for specific contaminants and improving their removal efficiencies as adsorbents.

Surface modification of carbon nanotubes to enhance cyclic hydrocarbons adsorption from aqueous solutions has proven effective. For example, Su et al. employed multi-walled carbon nanotubes (MWCNTs) that were oxidized by sodium hypochlorite (NaOCl) solution to enhance the adsorption of benzene and toluene from aqueous solution [F. Su, C. Lu, and S. Hu, "Adsorption of benzene, toluene, ethylbenzene and p-xylene by NaOCl-oxidized carbon nanotubes," *Colloids Surfaces A Physicochem. Eng. Asp.*, vol. 353, no. 1, pp. 83-91, January 2010.—incorporated herein by reference in its entirety]. NaOCl-oxidized CNTs have superior adsorption performance compared with many types of carbon and silica adsorbents previously reported in the literature. The work has been extended to additional cyclic hydrocarbons including xylene and ethyl benzene [F. Yu, J. Ma, and Y. Wu, "Adsorption of toluene, ethylbenzene and xylene isomers on multi-walled carbon nanotubes oxidized by different concentration of NaOCl," *Front. Environ. Sci. Eng. China*, vol. 6, no. 3, pp. 320-329, June 2011.— incorporated herein by reference in its entirety].

In view of the foregoing, one object of the present disclosure is to provide a metal oxide nanoparticle impregnated carbon nanotube nanocomposite for targeted adsorptive removal of cyclic hydrocarbon pollutants and processes for economically producing those composites that can efficiently and at a low cost treat cyclic hydrocarbon contaminated water.

BRIEF SUMMARY OF THE INVENTION

According to a first aspect, the present invention relates to a method for removing an cyclic hydrocarbon from an aqueous solution comprising para-xylene, toluene, or both, the method involving i) contacting an active adsorptive nanocomposite with the first aqueous solution to adsorb at least a portion of para-xylene, toluene, or both onto at least one surface of the active adsorptive nanocomposite, and ii) removing the active adsorptive nanocomposite with adsorbed para-xylene, toluene, or both to form a treated aqueous solution that has a lower para-xylene and/or toluene content than the first aqueous solution, wherein the active adsorptive nanocomposite comprises carbon nanotubes, and one or more metal oxide nanoparticles selected from the group consisting of aluminum oxide, zinc oxide, and iron oxide attached to a surface of the carbon nanotubes, wherein the metal oxide nanoparticles are present in 1-15% by weight, relative to the total weight of the active adsorptive nanocomposite.

In one embodiment, the contacting comprises mechanically mixing and/or sonicating the active adsorptive nanocomposite with the first aqueous solution.

In one embodiment, the active adsorptive nanocomposite is mechanically mixed with the first aqueous solution with a mechanical mixing speed of at least 200 rpm.

In one embodiment, the active adsorptive nanocomposite is contacted with the first aqueous solution at a weight per volume ratio of at least 25-150 mg of the active adsorptive nanocomposite per 100 mL of the first aqueous solution.

In one embodiment, the contacting is carried out for 20 min to 720 min.

In one embodiment, the active adsorptive nanocomposite is contacted with the first aqueous solution at a temperature range of 20° C. to 30° C.

In one embodiment, the first aqueous solution is a waste water stream.

In one embodiment, the waste water stream comprises at least 100 ppm of para-xylene and/or toluene.

In one embodiment, the carbon nanotubes are multi-walled carbon nanotubes.

In one embodiment, the metal oxide nanoparticles are zinc oxide and the contacting removes at least 77% of para-xylene from the first aqueous solution.

In one embodiment, the metal oxide nanoparticles are iron oxide and the contacting removes at least 68% of para-xylene from the first aqueous solution.

In one embodiment, the metal oxide nanoparticles are aluminum oxide and the contacting removes at least 75% of para-xylene from the first aqueous solution.

In one embodiment, the metal oxide nanoparticles are zinc oxide the contacting removes at least 11% of toluene from the first aqueous solution.

In one embodiment, the metal oxide nanoparticles are iron oxide and the contacting removes at least 17% of toluene from the first aqueous solution.

In one embodiment, the metal oxide nanoparticles are aluminum oxide and the contacting removes at least 17% of toluene from the first aqueous solution.

In one embodiment, the waste water stream has a pH range from 5-7.

According to a second aspect, the present invention relates to a process for forming an active adsorptive nanocomposite comprising i) sonicating a sufficient amount of multi-walled carbon nanotubes in a polar solvent to form a dispersion comprising deagglomerated carbon nanotubes, ii) mixing a solution comprising a metal salt dissolved in the polar solvent with the dispersion to form a nanocomposite solution wherein the metal salt is at least one selected from the group consisting of aluminum nitrate, zinc nitrate, and iron nitrate, iii) removing the polar solvent from the nanocomposite solution to form a dry nanocomposite; and iv) calcining the dry nanocomposite to form the active adsorptive nanocomposite wherein the active adsorptive nanocomposite comprises multi-walled carbon nanotubes, and one or more metal oxide nanoparticles selected from the group consisting of aluminum oxide, zinc oxide, and iron oxide attached to the surface of the carbon nanotubes.

In one embodiment, the polar solvent is an alcohol.

In one embodiment, the polar solvent is removed from the nanocomposite solution at a temperature of at least 90° C.

In one embodiment, the dry nanocomposite is calcined at a temperature of at least 350° C.

DETAILED DESCRIPTION OF THE EMBODIMENTS

Processes for removing cyclic hydrocarbons from water sources are known to be ineffective at removing low concentrations of dissolved cyclic hydrocarbons due to active materials with low surface areas, and limited hydrocarbon specificity in the active adsorptive materials used. Therefore, a process for removing cyclic hydrocarbons in high yield using active adsorptive nanocomposites impregnated with different metal oxide nanoparticles is advantageous.

According to a first aspect, the present invention relates to a method for removing a cyclic hydrocarbon from a first aqueous solution wherein the method includes contacting an active adsorptive nanocomposite with a first aqueous solution in a ratio to adsorb at least a portion of para-xylene, toluene, or both onto at least one surface of the active adsorptive nanocomposite.

In one embodiment, an exemplary active adsorptive nanocomposite to first aqueous solution ratio may be 25-150 mg/100 mL.

A cyclic hydrocarbon as used herein could refer to any chemical species comprising a cyclic ring structure and/or at least one carbon to carbon double bond. In one embodiment, the cyclic hydrocarbon is selected from the group consisting of, toluene, para-xylene, ethyl benzene, and/or any combination thereof.

In a preferred embodiment, the cyclic hydrocarbon is selected from a group consisting of toluene, para-xylene or both.

It is envisioned that the disclosed invention may be adapted to increase the removal of other cyclic hydrocarbons from aqueous solutions. Examples of other cyclic hydrocarbons include, but are not limited to, mesitylene, durene, 2-phenylhexane, biphenyl, styrene, naphthalene, phenol, aniline, nitrobenzene, benzoic acid, acetylsalicylic acid, paracetamol, picric acid, anthracene, phenanthrene, tetracene, chrysene, triphenylene, pyrene, pentacene, corannulene, coronene, ovalene, benzo[a]pyrene, benzo[ghi]perylene, acenaphthene, acenaphthylene, benzo[a]anthracene, benzo[e]pyrene, benzo[b]fluoranthene, benzo[j]fluoranthene, benzo[k]fluoranthene, dibenz[a,h]anthracene, fluoranthene, fluorine, indeno[1,2,3-cd]pyrene, phenanthrene, dicyclopentadiene and mixtures thereof.

It is also envisioned that the disclosed invention may be adapted to incorporate and increase the removal of volatile organic compounds (VOCs) from aqueous solutions. Examples of volatile organic compounds (VOCs) include, but are not limited to, methyl tertiary butyl ether (MTBE), carbon tetrachloride, p-dichlorobenzene, trichloroethylene, vinyl chloride, 1,1,1-trichloroethane, 1,1-dichloroethylene, 1,2-dichloroethane, cis-1,2-dichloroethylene, monochlorobenzene, cholorobenzene, o-dichlorobenzene, tetrachloroethylene, trans-1,2-dichloroethylene, 1,2-dichloropropane, dichloromethane, 1,1,2-trichloroethane, 1,2,4-trichlorobenzene, perchloroethylene, chlorofluorocarbons, and mixtures thereof.

The active adsorptive nanocomposite as used herein refers to a multi-component material wherein at least one of the components has at least one, two, or three dimensions of less than 100 nm. In general, the mechanical, electrical, thermal, optical, electrochemical and catalytic properties of the nanocomposite could differ from that of the component materials as the respective phase dimension decrease below 100 nm.

In the present disclosure, the active adsorptive nanocomposite includes carbon nanotubes, and one or more metal oxide nanoparticles selected from the group consisting of aluminum oxide, zinc oxide, and iron oxide attached to a surface of the carbon nanotubes. Carbon nanotubes (CNTs) as used herein refer to allotropes of carbon with a cylindrical nanostructure with a significantly large length-to-diameter ratio (up to 100,000,000:1). These cylindrical carbon molecules have unusual properties, which are valuable for nanotechnology, electronics, optics and other fields of materials science and technology. In particular owing to their extraordinary thermal conductivity and mechanical and electrical properties, carbon nanotubes find applications as additives to various structural materials.

A carbon nanotube composition comprises a hollow porous structure with "walls" formed by one-atom-thick sheets of carbon, called graphene. These sheets are rolled at specific and discrete ("chiral") angles, and the combination of the rolling angle and radius determines the nanotube properties, while imbuing the nanotubes with large surface areas of reactive unsaturated carbon atoms. Furthermore, nanotubes are categorized as single-walled nanotubes (SWNTs) or multi-walled nanotubes (MWNTs).

In one embodiment, the carbon nanotubes of the present disclosure are "raw" or lacking any surface functionalization or modifications. It is envisioned that the present invention may be adapted to incorporate surface functionalized and/or surface modified carbon nanotubes. These surface modifications may be covalent, non-covalent or mixtures thereof. Examples of functional groups on the carbon nanotubes include alcoholic, carboxylic, aldehydic, ketonic and esteric oxygenated functional groups. Alternatively, the carbon nanotubes of the present disclosure may be surface modified with amine functionality or other functionality that is proton absorbing or basic.

In one embodiment, the raw carbon nanotubes may be treated with an acid such as $HNO_3$, HF, HCl and $H_2SO_4$. The acid treatment may enhance the adsorption properties and affect the pore size and/or surface characteristics of the carbon nanotubes. Alternatively, the raw carbon nanotubes may be treated with a base such as NaOH. The base treatment may enhance the adsorption properties and affect the pore size and/or surface characteristics of the carbon nanotubes.

Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite. The Russian Doll structure is observed more commonly, its individual shells can be described as SWNTs. In either model, the number of active binding sites per volume of carbon MWNTs (MWCNTs) vs carbon SWNTs (SWCNTs) is larger, making it a more robust structural material for the active adsorptive nanocomposite. In one embodiment, the carbon nanotubes are multi-walled carbon nanotubes. In one embodiment, the carbon nanotubes are mixture of SWNTs and MWNTs.

Carbon nanotubes exhibit strong adsorption affinities to a wide range of cyclic and aliphatic contaminants in water. The large adsorption capacity of CNTs for organic material is primarily due to their pore structure and their large hydrophobic surface areas. Carbon nanotubes show similar adsorption capacities as activated carbons in the presence of natural organic matter. Highly-purified metal-impregnated carbon nanotubes have advantageous properties and performance in removing cyclic hydrocarbons from aqueous solutions when compared to conventional approaches due to their ability to direct the selective uptake of cyclic hydrocarbon species based both on the nanotube's controlled pore size, high surface area and ordered chemical structure. Thus, they are an advantageous adsorbent material for targeted contaminant removal in water and wastewater treatment systems as well.

Nanoparticles as used herein refer to particles between 1 and 100 nm in size. When compared to their respective bulk materials, nanoparticles display distinctive chemical and physical properties due to size related quantum confinement effects. Luminescence, surface area, catalytic tendencies, electrical conductivity, and magnetization can all be altered by changes in the dimensionality of nanoparticles.

Metal oxide nanoparticles within the tubular cavity and/or on the surface of the carbon nanotubes occupy voids within the porous structure. Incorporating nanoparticles, which generally have a high surface area and enhanced catalytic sensitivity, could provide an additional surface for cyclic hydrocarbon adsorption when coupled to carbon nanotubes. Further, the selectivity of the active nanocomposite towards different aromatic hydrocarbons can be changed by changing the metal of the metal oxide.

In one embodiment, the metal oxide nanoparticles of the present disclosure can be synthesized and formed into a variety of morphologies and may refer to nanoparticles, nanocrystals, nanospheres, nanoplatelets, nanowires, nanorods, nanotubes, nanocylinders, nanoboxes, nanostars, tetrapods, nanobelts, nanoflowers, etc. and mixtures thereof.

In a preferred embodiment, the active adsorptive nanocomposite of the present disclosure includes metal oxide nanoparticles comprising at least one selected from the group consisting of aluminum oxide, iron oxide, and zinc oxide.

In one embodiment, the nanocomposite comprises metal oxide nanoparticles with crystal nanoparticle morphology and an average particle size of 1-40 nm, preferably 1-35 nm, preferably 1-15 nm.

The percentage of metal oxide "impregnated" on the carbon nanotubes may also affect the adsorption characteristics of the active adsorptive nanocomposite. In a preferred embodiment, the active adsorptive nanocomposite comprises metal oxide nanoparticles in a range of 5-15%, preferably 8-12% or about 10% by weight, relative to the total weight of the active adsorptive nanocomposite.

Different metal oxides may result in preferential binding affinities for different contaminants. Therefore, a single adsorptive nanocomposite could be made to target more than one contaminant. In one embodiment, the active nanocomposite comprises zinc oxide, aluminum oxide and iron oxide nanoparticles, wherein para-xylene and/or toluene are targeted for absorption.

"Active" as used herein refers to any material, reaction or process that is in a physical state, chemical phase and/or both to initiate a subsequent chain of events without any further alterations or adjustment to it.

Nanoparticle and nanocomposite characterization is necessary to establish understanding and control of nanoparticle and nanocomposite synthesis, assembly and applications. In one embodiment, the metal oxide nanoparticles and active adsorptive nanocomposite are characterized by at least one instrument selected from the group consisting of a scanning electron microscope, a thermogravimetric analyzer, an X-ray diffractometer.

In another embodiment, it is envisioned that characterization is done using a variety of other techniques. Common exemplary techniques include, but are not limited to, electron microscopy (TEM), atomic force microscopy (AFM), dynamic light scattering (DLS), Fourier transform infrared spectroscopy (FTIR), matrix-assisted laser desorption/ionization time-of-flight mass spectrometry (MALDI-TOF), ultraviolet-visible spectroscopy, Rutherford backscattering spectrometry (RBS), dual polarization interferometry and nuclear magnetic resonance (NMR).

The first aqueous solution as used herein could refer to any water source or system comprising a sufficient amount of a cyclic hydrocarbon species. Examples of such water sources and systems include, but are not limited to, surface water that collects on the ground or in a stream, aquifer, river, lake, reservoir or ocean, ground water that is obtained by drilling wells, run-off, industrial water, public water storage towers, public recreational pools, an industrial waste water stream and bottled water. In one embodiment, the aqueous solution is a waste water stream.

As used herein, a "sufficient amount" could be any quantity of a parameter, and/or component that produces a desired product and or reaction when applied. In the case of the disclosed invention, the desired product and/or reaction is an adsorption of at least a portion of the cyclic hydrocarbon from the first aqueous solution onto at least one surface of the active nanocomposite.

In the present disclosure "contacting" could refer to any process of interacting different chemical components in order to foster a chemical or physical change between the components. In one embodiment, the contacting comprises mechanically mixing the active adsorptive nanocomposite with the first aqueous solution. In one preferred embodiment, the contacting comprises sonicating the active nanocomposite with the first aqueous solution.

Adsorption or adsorb as used herein may refer to the adhesion of atoms, ions or molecules from a gas, liquid or dissolved solid to a surface. This process creates a film of the adsorbate on the surface of the adsorbent. This process differs from absorption, in which a fluid (the adsorbate) permeates or is dissolved by a liquid or solid (the absorbent). Adsorption is a surface-based process while absorption involves the whole volume of the material. The term sorption encompasses both processes, while desorption is the reverse of it. Adsorption is a surface phenomenon. In one embodiment, the cyclic hydrocarbon is adsorbed onto a surface of nanocomposite during the contacting, wherein the cyclic hydrocarbon adheres to the at least one surface of the carbon nanotube, a surface of metal oxide nanoparticle, or both.

How efficiently the adsorption occurs in the disclosed method may be dependent upon a number of parameters. The rate of the contacting, the contacting time, the active nanocomposite dosage, the temperature during the contacting, the first aqueous solution pH and the metal oxide nanoparticle used in the active nanocomposite could all be adjusted to vary the adsorption efficiency and the preferred cyclic hydrocarbon absorbed.

In one preferred embodiment, the active adsorptive nanocomposite is mechanically mixed with the first aqueous solution at a sufficient mechanical mixing speed of at least 150-500 rpm, preferably at least 175-400 rpm, more preferably 190-225 rpm or 200 rpm. In one embodiment, the contacting is carried out for 30 min to 720 min, preferably 45 min to 600 min, more preferably 60 min to 500 min or 480 min In one embodiment, a dosage of the active adsorptive nanocomposite used is at least 25%, preferably at least 40%, more preferably at least 50% by mass (mg) of a para-xylene concentration, a toluene concentration or both (ppm) within the first aqueous solution.

In one embodiment, the first aqueous solution has a pH range from 4-8, preferably 5-7 or a pH of 6.

In one embodiment, the contacting occurs at a temperature range of 20° C. to 30° C., preferably 22 to 27° C.

In one embodiment, the metal oxide nanoparticles are zinc oxide and the contacting removes at least 70%, preferably at least 73%, preferably at least 75%, preferably at least 78%, preferably at least 80%, more preferably 83%, more preferably 85%, more preferably 89% of para-xylene from the first aqueous solution.

In one embodiment, the contacting removes at least 87% of para-xylene from the first aqueous solution wherein the metal oxide nanoparticles are preferably zinc oxide, a para-xylene concentration in the first aqueous solution is at least 100 ppm, the dosage range is 25-150 mg mg/100 ml, the pH is from 5-7, the temperature is from 20-30° C., the contacting time is 20-720 min and a mixing rate of 150-500 rpm.

In one embodiment, the metal oxide nanoparticles are iron oxide and the contacting removes at least 60%, preferably at least 65%, preferably at least 70%, preferably at least 75%, preferably at least 80%, more preferably 85%, more preferably 86% of para-xylene from the first aqueous solution.

In one embodiment, the contacting removes at least 86% of para-xylene from the first aqueous solution wherein the metal oxide nanoparticles are iron oxide, a para-xylene concentration in the first aqueous solution is at least 100 ppm, the dosage is 25-150 mg mg/100 ml, the pH is from 5-7, the temperature is from 20-30° C., the contacting time is 20-720 min and a mixing rate of 150-500 rpm.

In one embodiment, the metal oxide nanoparticles are aluminum oxide and the contacting removes at least 69%, preferably at least 72%, preferably at least 76%, preferably at least 78%, preferably at least 80%, more preferably 83%, more preferably 85%, more preferably 89% of para-xylene from the first aqueous solution. In one embodiment, the contacting removes at least 89% of para-xylene from the first aqueous solution wherein the metal oxide nanoparticles are aluminum oxide, a para-xylene concentration in the first aqueous solution is at least 100 ppm, the dosage is 25-150 mg mg/100 ml, the pH is from 5-7, the temperature is from 20-30° C., the contacting time is 20-720 min and a mixing rate of 150-500 rpm.

In one embodiment, the metal oxide nanoparticles are zinc oxide the contacting removes at least 11% preferably at least 22%, preferably at least 48%, preferably at least 51% of toluene from the first aqueous solution. In one embodiment, the contacting removes at least 51% of toluene from the first aqueous solution wherein the metal oxide nanoparticles are zinc oxide, a toluene concentration in the first aqueous solution is at least 100 ppm, the dosage is 25-150 mg mg/100 ml, the pH is from 5-7, the temperature is from 20-30° C., the contacting time is 20-720 min and a mixing rate of 150-500 rpm. In one embodiment, the metal oxide nanoparticles are iron oxide and the contacting removes at least 17%, preferably at least 32%, preferably at least 52%, preferably at least 54% of toluene from the first aqueous solution.

In one embodiment, the contacting removes at least 54% of toluene from the first aqueous solution wherein the metal oxide nanoparticles are iron oxide, a toluene concentration in the first aqueous solution is at least 100 ppm, the dosage is 25-150 mg mg/100 ml, the pH is from 5-7, the temperature is from 20-30° C., the contacting time is 20-720 min and a mixing rate of 150-500 rpm.

In one embodiment, the metal oxide nanoparticles are aluminum oxide and the contacting removes at least 17%, preferably at least 22%, preferably at least 44%, preferably at least 54% of toluene from the first aqueous solution. In one embodiment, the contacting removes at least 54% of toluene from the first aqueous solution wherein the metal oxide nanoparticles are aluminum oxide, a toluene concentration in the first aqueous solution is at least 100 ppm, the dosage is 25-150 mg mg/100 ml, the pH is from 5-7, the temperature is from 20-30° C., the contacting time is 20-720 min and a mixing rate of 150-500 rpm.

The contacting may be carried out within a variety of vessels depending on the scale of the application. Examples of vessels include but are not limited to containers, storage tanks, and reservoirs, Alternate embodiments could be envisioned wherein the contacting occurs by filtering a portion of the first aqueous solution through a membrane comprising the active adsorptive nanocomposite.

In the present disclosure, the active adsorptive nanocomposite with adsorbed para-xylene, toluene, or both is removed to form a treated aqueous solution that has a lower para-xylene and/or toluene content than the first aqueous solution.

"Removing" as used herein refers to any process of separating chemical and/or physically distinctive components from one another. The active adsorptive nanocomposite with adsorbed cyclic hydrocarbons and the treated aqueous solution exhibit differences in boiling/melting/subliming temperature that may be exploited. Alternative removing steps could be envisioned. Examples of alternate removing steps include, filtering, decanting, and evaporating at least a portion of the treated aqueous solution.

In one embodiment, the first aqueous solution comprises at least 50 ppm preferably at least 60 ppm, preferably at least 70 ppm, more preferably at least 80 ppm, more preferably at least 90 ppm, more preferably at least 100 ppm, more preferably 120 ppm, more preferably 140 ppm, more preferably at least 170 ppm of para-xylene and/or toluene relative to the first aqueous solution.

According to a second aspect, the present invention relates to a process for forming an active adsorptive nanocomposite for use in the method for removing cyclic hydrocarbons from the first aqueous solution. The process is consistent with production of the active adsorptive nanocomposite described herein, in one or more of their embodiments. The process involves sonicating a sufficient amount of multi-walled carbon nanotubes in a polar solvent to form a dispersion comprising deagglomerated carbon nanotubes.

The process described herein is characterized as wet chemistry and is considered simple and cost effective compared to other processes facilitating the binding, embedding or loading of metal oxide nanoparticles to the surface and pore spaces of carbon nanotubes. The process of the present disclosure involves no pre-processing, surface-processing and/or coatings.

In one embodiment, raw carbon nanotubes are dispersed in a polar solvent including, but not limited to acetone, acetonitrile, methanol, ethanol, n-propanol, methylethylketone, cyclohexanone, diethyl ether, dibutyl ether, ethyl acetate, isopropyl acetate, butyl acetate, amines, acetamide, methylene chloride, chloroform, hexafluoromethaxylene, dimethylsulfoxide, dimethylformamide or n-methyl-2-pyrrolidone until a substantially homogeneous dispersion is formed.

In a preferred embodiment, the carbon nanotubes are multi-walled carbon nanotubes, single-walled carbon nanotubes, hybrid nanotubes or mixtures thereof.

In one embodiment, the dispersion does not contain a surfactant. The nanotubes may be dispersed using sonication to aid the formation of the dispersion. The nanotubes may be dispersed by sonicating for 10-60 minutes, preferably 15-45 minutes, more preferably about 30 minutes. Inherent agglomeration prevention properties of the nanoparticles themselves may aid dispersion.

In another embodiment, if necessary surfactants can be used to aid in the dispersion. Surfactants are compounds that lower the surface tension (or interfacial tension) between two liquids or between a liquid and a solid. Surfactants may act as detergents, wetting agents, emulsifiers, foaming agents and dispersants. Surfactants are commonly used to better disperse solid nanoparticles in a fluid. They can also make the dispersion easier to process and stabilize the dispersion by inhibiting crystallization or precipitation of the nanocomposites. Suitable surfactants include amphoteric, cationic, anionic and nonionic surfactants. Examples of surfactants include ammonium lauryl sulfate, sodium lauryl sulfate (SDS, sodium dodecyl sulfate), sodium lauryl ether sulfate, sodium myreth sulfate, dioctyl sodium sulfosuccinate, perfluorooctanesulfonate, sodium stearate, octenidine dihydrochloride, cetyl trimethylammonium bromide (CTAB), 5-bromo-5-nitro-1,3-dioxane and the like.

Subsequently, a metal salt is dissolved in a polar solvent such as acetone, acetonitrile, methanol, ethanol, n-propanol, methylethylketone, cyclohexanone, diethyl ether, dibutyl ether, ethyl acetate, isopropyl acetate, butyl acetate, amines, acetamide, methylene chloride, chloroform, hexafluoromethaxylene, dimethylsulfoxide, dimethylformamide and n-methyl-2-pyrrolidone. The metal oxide precursors are generally salt precursors such as chlorides and nitrates that can precipitate in water as the oxo-hydroxide form. Precursors of the metal oxide (i.e. metal salt) nanoparticles and carbon nanotubes are added at specific mass ratios. In one embodiment, the mass ratio range of carbon nanotubes to metal salt is from 0.5:1-19:1, 2:1-8:1, 3:1-7:1, 4:1-6:1.

The metal salt is selected with regards to the polar solvent, and serves as a soluble metal oxide nanoparticle precursor for the formation of a respective metal oxide nanoparticle during subsequent processing steps. The mixing results in the impregnation of metal oxide nanoparticle precursors onto and within the deagglomerated carbon nanotubes. As a result, metal salts other than metal nitrates could be envisioned including but not limited to metal halides, metal carbonates, metal alkoxides and metal hydroxides.

Depending upon the cyclic hydrocarbon targeted for removal a wider array of metals could be envisioned. Examples include but are not limited to, copper, magnesium, zirconium, titanium, vanadium, rhodium, rhenium, silicon, molybdenum, thorium, chromium, manganese, cerium, lanthanum, neodymium, praseodymium, samarium, gadolinium, terbium erbium, thulium, ytterbium, lutetium, lead, cadmium, calcium, antimony, tin, bismuth, cobalt, tungsten, and any mixtures thereof.

The reaction conditions may be adjusted depending upon the type of metal oxide precursor being impregnated onto or within the deagglomerated carbon nanotubes. In one embodiment, the metal salt solution is added dropwise to the dispersion of deagglomerated carbon nanotubes. In some embodiments, the mixing may involve sonication. The sonication could be performed for 10-60 minutes, preferably 15-45 minutes, more preferably about 30 minutes. In alternate embodiments heat may be necessary during the mixing. Reaction temperature ranges could include 100-225° C., preferably 120-200° C.

The process also involves removing the polar solvent from the nanocomposite solution to form a dry nanocomposite. Once the mixing is completed and the metal oxide nanoparticle precursor has been impregnated onto or into the carbon nanotubes, excess dissolved salts, and chemical reagents should be separated. The removing as used herein refers to any processing steps that minimize excess dissolved chemical species and/or byproducts that are not critical to the formation of the active adsorptive nanocomposite.

In one embodiment, the removing comprises cooling the nanocomposite solution to room temperature, filtering the cooled nanocomposite solution to form a nanocomposite filtrate and washing the filtrate at least once with a suitable solvent selected from deionized water and/or the polar solvent, for example ethanol. The resulting nanocomposite filtrate is dried at an elevated temperature to remove all solvent and excess dissolved chemical species and/or byproducts. In one embodiment drying temperatures could be in the range of 80–120° C., preferably 90-110° C., preferably 100° C. The length of drying may be affected by the choice and amount of solvent. In one embodiment, the removing comprises filtering to form the nanocomposite filtrate and drying to form the dry nanocomposite.

The process also involves calcining the dry nanocomposite to form the active adsorptive nanocomposite. The calcining is the conversion step where the impregnated metal oxide nanoparticle precursors mentioned during the mixing form metal oxide nanoparticles. At elevated temperatures metal oxides are a stable chemical product and are energetically favored. As a result, less stable chemical portions of the metal oxide precursor become gaseous and leave behind the desired metal oxide. The extent to which the metal oxide nanoparticle conversion takes place and subsequently how effective the resulting adsorptive nanocomposite will be is a function of the calcining temperature and time of exposure. In one embodiment, calcination is performed at 200-400° C. for up to 8 hours, preferably 250-400° C. for up to 6 hours, preferably 300-400° C. for up to 4 hours, preferably 350° C. for 4 hours.

The resulting active adsorptive nanocomposite may include carbon nanotubes coated, embedded, or impregnated with nanoparticle metal oxide for use in the methods of removing cyclic hydrocarbons from aqueous solution in one or more of their embodiments previously described herein.

The method of forming the active adsorptive nanocomposite described herein is a liquid-solid and/or solid-solid transformation. These are the most broadly used in order to control nanocomposite morphology. In addition, gas-solid transformation methods can be envisioned including, but not limited to, chemical vapor deposition (CVD) processes such as metalorganic, plasma-assisted, thermally activated/pyrolytic and photo CVD methodologies and multiple-pulsed laser deposition.

It is envisioned that the process for producing the active adsorptive nanocomposite for the removal of cyclic hydrocarbons may be adapted to incorporate other techniques. Examples of other techniques that may be used to synthesize the active adsorptive nanocomposite include, but are not limited to, hot pressing of composite powder, pressure less sintering technique, direct in-situ growth, in-situ chemical vapor deposition (CVD) synthesis route, pulsed laser deposition, high-intensity ultrasonic radiation method, assembling pre-synthesized metal oxide nanoparticles as building blocks on CNTs, spontaneous formation of metal oxide nanoparticles on CNTs, thermal decomposition of metal oxide precursors directly onto the surface of carbon nanotubes, hydrothermal crystallization, sol-gel followed by spark plasma sintering process, surfactant wrapping sol-gel method, chemical precipitation and controlled hetero-aggregation method.

The examples below are intended to further illustrate protocols for preparing and characterizing active adsorptive nanocomposites comprising metal oxide nanoparticle impregnated carbon nanotubes, and uses thereof. Further they are intended to illustrate assessing these adsorbent materials for cyclic hydrocarbon removal efficiency described herein, and are not intended to limit the scope of the claims

EXAMPLE 1

Chemicals

Commercial multiwall carbon nanotubes were purchased from "Timesnano" with purity of >95% (by weight). Other chemicals which include iron nitrate, aluminum nitrate, zinc nitrate, ethanol, toluene, p-xylene (99.7% purity), nitric acid (>69% purity) and sodium hydroxide of analytical grade, were purchased from Sigma Aldrich and used as received without any further treatment.

EXAMPLE 2

Preparation of Adsorbent Materials

For impregnation of metal oxide nanoparticles on the surface of CNTs, required amount of CNTs was weighed, poured into sufficient amount of ethanol, and ultra-sonicated for 30 minutes in order to properly deagglomerate and disperse CNTs in solvent. 10% (weight based on CNTs plus metallic salt) aluminum nitrate salt was dissolved in sufficient amount of ethanol, added to CNTs and was sonicated for further 30 minutes. Then, the sample was shifted to oven for drying at 90° C. After complete drying of ethanol, the sample was calcined in furnace at 350° C. temperature for 4 hours.

EXAMPLE 3

Adsorption Experiments

Batch adsorption experiments were performed for removal of the cyclic hydrocarbon from water. Adsorbents were weighed and added to glass flasks. Distilled deionized water was taken in order to prepare solution of toluene. Solution of 100 ppm concentration was prepared in a volumetric flask and stirred using magnetic stirrer to get homogeneous solution. Glass flasks containing adsorbents were filled (100 ml) with toluene solution and were placed on shaker for specific time (2 hour) and 200 shaking rpm at room temperature. After completion of provided contact time; samples were removed from shaker and filtered to collect sample for analysis of concentration. The adsorption capacity of the cyclic hydrocarbon on CNTs surface was calculated by following relation $$q = \frac{(C_0 - C)}{m} * V \qquad (1)$$

While;
q=Adsorption capacity (mg/g)
$C_0$=Initial concentration of cyclic hydrocarbon in sample (mg/l)
C=Final concentration (mg/l)
V=Volume of sample (ml)
m=Amount of adsorbent (g)
Percentage removal was found using following relation.

$$\text{Removal (\%)} = \frac{C_0 - C}{C_0} * 100 \qquad (2)$$

EXAMPLE 4

Characterization of Adsorbents

Raw CNTs and impregnated CNTs were analyzed using characterization technique of SEM, EDX and TGA analysis. SEM provided the information about physical morphology of sample while EDX provided the elemental analysis of materials. Thermogravimetric analysis was carried out using TGA equipment in order to check the thermal degradation and purity of materials.

EXAMPLE 5

Concentration of Adsorbate

Concentration of toluene, para-xylene or both in water was determined using COD analysis. Ready-made COD analysis vials were filled with 2 ml of sample and digested for 120 minutes at 150° C. temperature. After digestion samples were cooled at room temperature and then analyzed using photo spectrometer (Hach Model: DR3900).

EXAMPLE 6

Characterization of Adsorbents

Figure 1A:
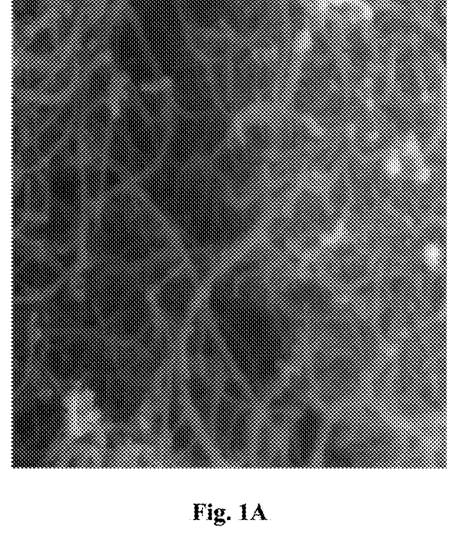
FIG. 1A is a scanning electron microscope (SEM) micrograph of raw multi-walled carbon nanotubes (MWCNTs).
Figure 1B:
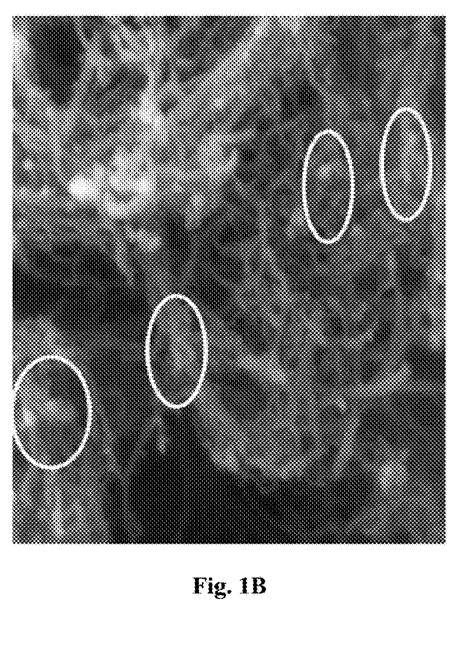
FIG. 1B is a SEM micrograph of zinc oxide nanoparticle impregnated MWCNTs.
Figure 1C:
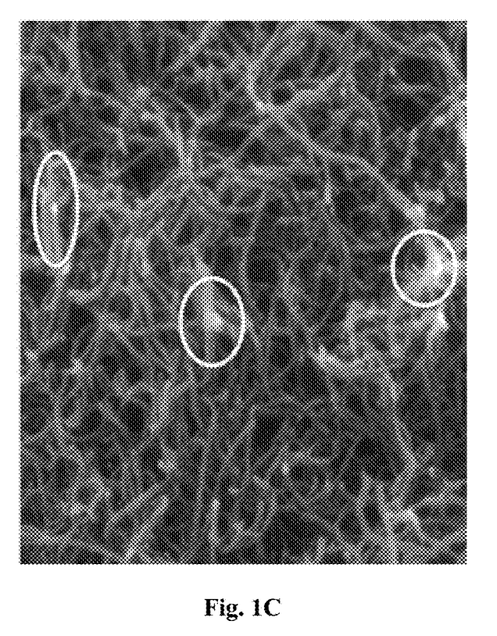
FIG. 1C is a SEM micrograph of iron oxide nanoparticle impregnated MWCNTs.
Figure 1D:
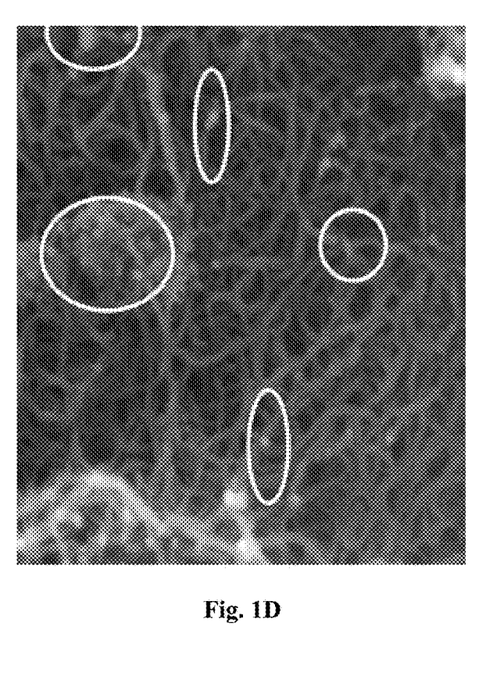
FIG. 1D is a SEM micrograph of aluminum oxide nanoparticle impregnated MWCNTs.
Figure 2:
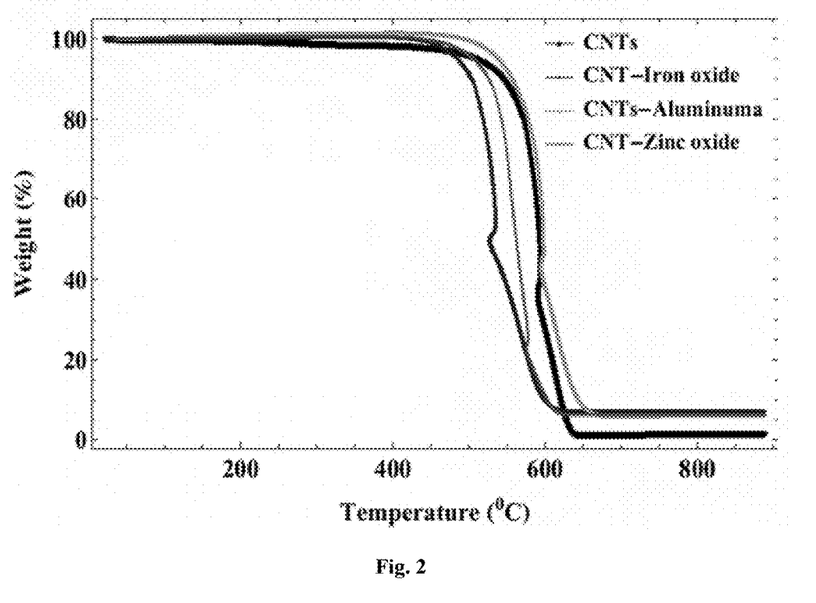
FIG. 2 is a thermal gravimetric analysis (TGA) of raw and modified MWCNTs.

FIGS. 1A, 1B, 1C, and 1D represent the SEM image of both raw and metal oxide nanoparticles impregnated MWCNTs. All images were taken using 15 KV energy and view filed of 3 μm while at resolution of 63×. It is observed that surface of raw CNTs was smooth but more agglomerated in shown in part. Metal oxides nanoparticles impregnated CNTs appear more dispersed and presences of metal oxide nanoparticles impregnation on CNTs can be observed in yellow circles.

Figure 3A:
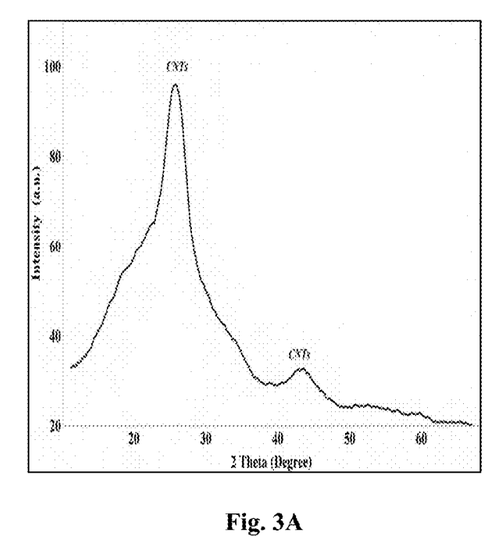
FIG. 3A is an X-ray diffraction (XRD) spectra of raw MWCNTS.
Figure 3B:
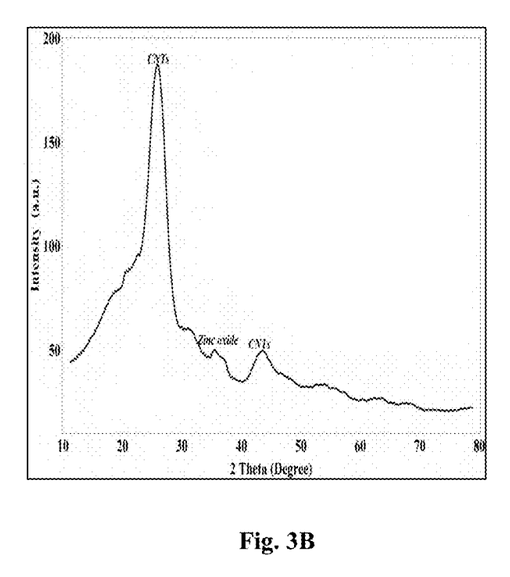
FIG. 3B is an X-ray diffraction (XRD) spectra of zinc oxide nanoparticle impregnated MWCNTs.
Figure 3C:
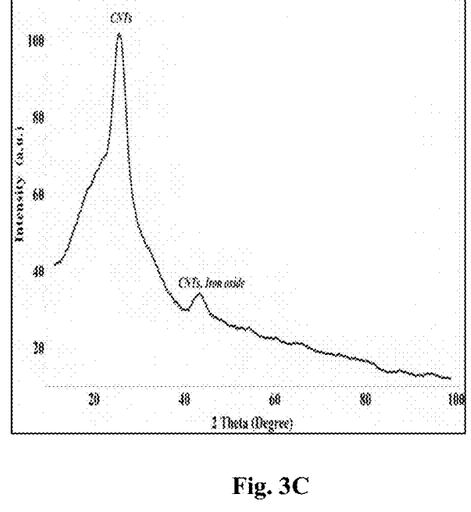
FIG. 3C is an X-ray diffraction (XRD) spectra of iron oxide nanoparticle impregnated MWCNTs.
Figure 3D:
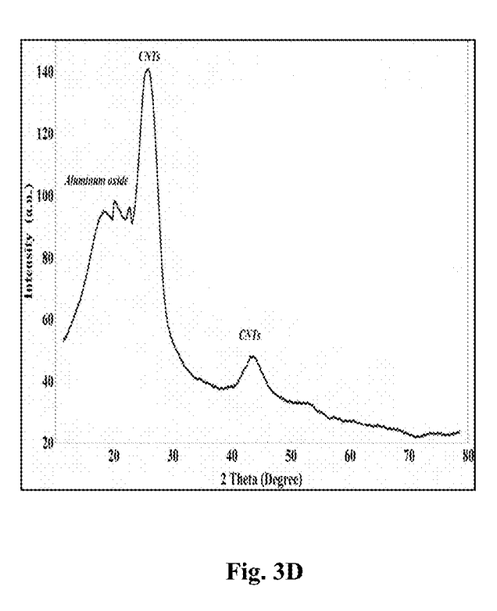
FIG. 3D is an X-ray diffraction (XRD) spectra of aluminum oxide nanoparticle impregnated MWCNTs.
Figure 4:
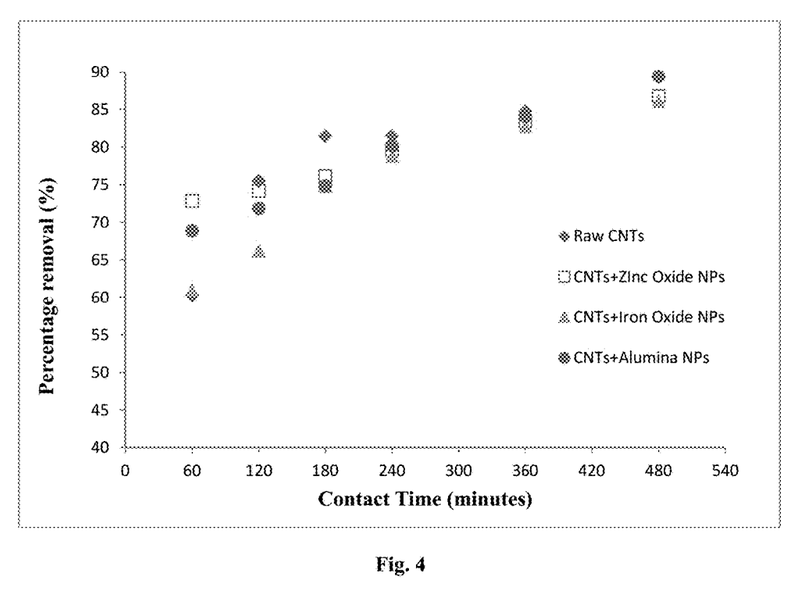
FIG. 4 illustrates the effect of contact time on removal efficiency of para-xylene for raw and metal oxide impregnated MWCNTs.
Figure 5A:
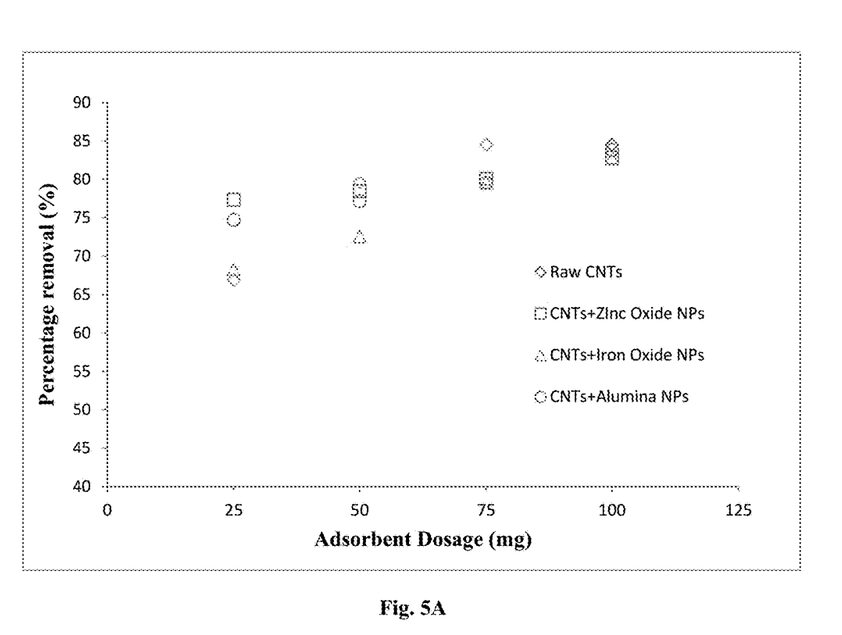
FIG. 5A illustrates the effect of active adsorptive nanocomposite dosage on removal efficiency of para-xylene for raw and metal oxide impregnated MWCNTs.
Figure 5B:
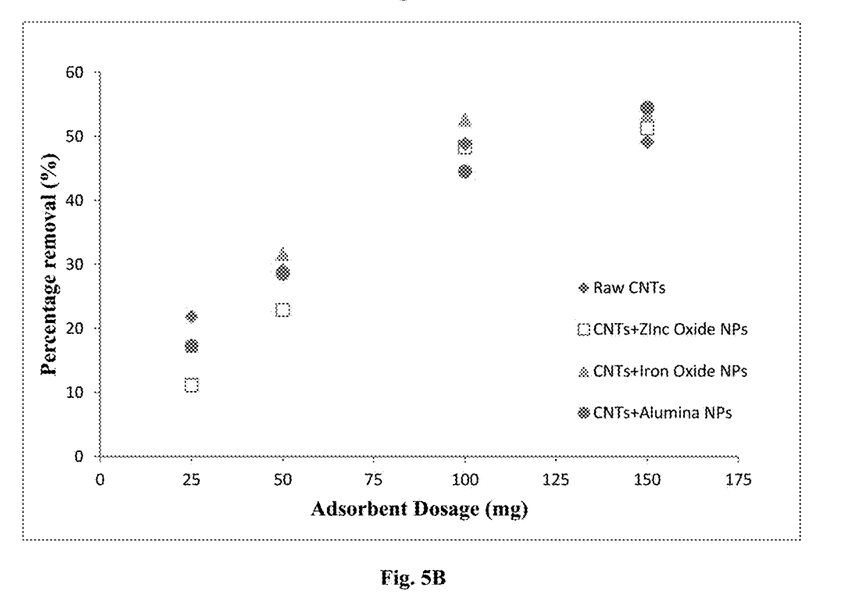
FIG. 5B illustrates the effect of active adsorptive nanocomposite dosage on removal efficiency of Toluene for raw and metal oxide impregnated MWCNTs.
Figure 6A:
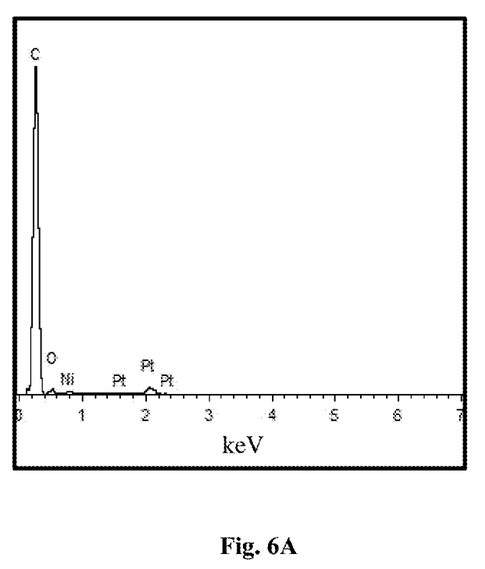
FIG. 6A is an energy dispersive X-ray (EDX) spectra for raw MWCNTs.
Figure 6B:
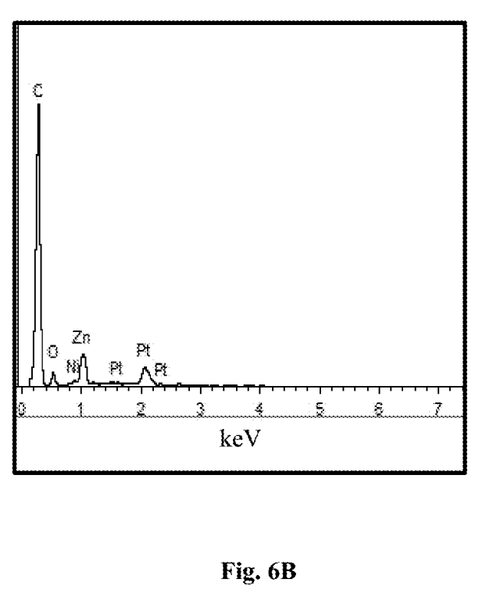
FIG. 6B is an energy dispersive X-ray (EDX) spectra for zinc oxide impregnated MWCNTs.
Figure 6C:
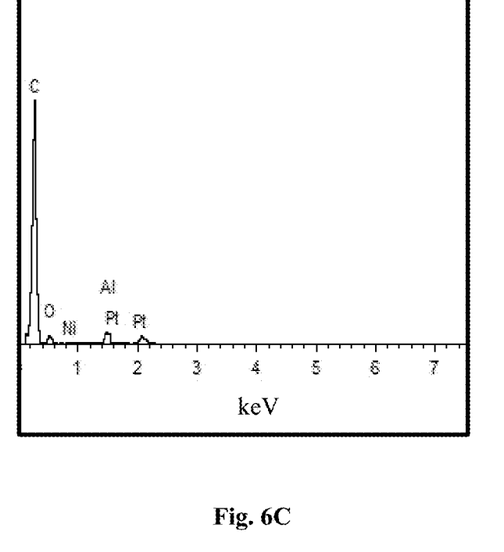
FIG. 6C is an energy dispersive X-ray (EDX) spectra for aluminum oxide impregnated MWCNTs.
Figure 6D:
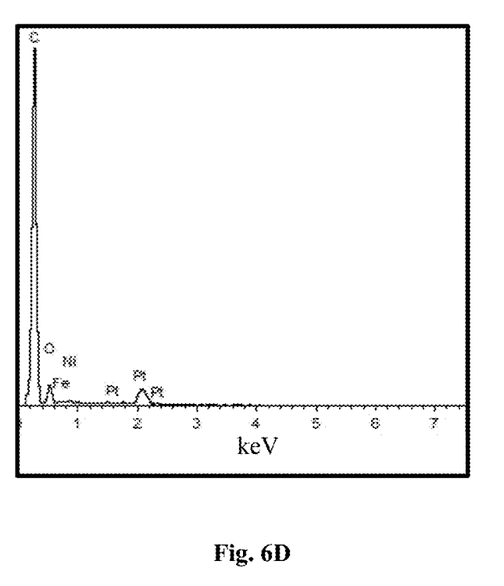
FIG. 6D is an energy dispersive X-ray (EDX) spectra for iron oxide impregnated MWCNTs.

FIGS. 7A, 7B, 7C, and 7D provide EDX analysis and presence of carbon peak as main constituent in all samples and impregnated metal oxides in respective samples can be verified. Nickel peak appear in all samples because nickel was used for growing CNTs. FIG. 3 indicates the TGA of both raw and metal oxide nanoparticles impregnated CNTs. It can be observed that after a small weight loss initially due to moisture presence, all materials were stable up to 450° C. Raw CNTs started burning around 530° C. while iron oxide and zinc oxide impregnated CNTs degraded around 450° C. due to higher thermal conductivity of zinc oxide and iron oxide. There was no change in burning temperature of sample containing aluminum oxide nanoparticles because alumina has low thermal conductivity. It can also be observed that that the residual weight percentage of ash at the end of analysis was around 1.5% for raw CNTs and it was around 7% for all metal oxide nanoparticles impregnated CNTs. Higher weight residue for impregnated CNTs is representation of metal oxide nanoparticles left at the end of experiment.

The invention claimed is:

1. A method for removing toluene from a first aqueous solution comprising toluene, the method comprising:
   contacting an active adsorptive nanocomposite with the first aqueous solution to adsorb at least a portion of the toluene onto at least one surface of the active adsorptive nanocomposite; and
   removing the active adsorptive nanocomposite with adsorbed toluene from the first aqueous solution to form a treated aqueous solution that has a lower toluene content than the first aqueous solution;
   wherein the active adsorptive nanocomposite comprises carbon nanotubes, and
      zinc oxide nanoparticles attached to a surface of the carbon nanotubes, wherein the zinc oxide nanoparticles are present in 1-15% by weight, relative to the total weight of the active adsorptive nanocomposite, and
      wherein the amount of the active adsorptive nanocomposite present during the contacting is 25-50 mg/100 ml of the first aqueous solution.

2. The method of claim 1, wherein the active adsorptive nanocomposite is mechanically mixed with the first aqueous solution with a mechanical mixing speed of at least 200 rpm.

3. The method of claim 1, wherein the contacting is carried out for 30 min to 720 min.

4. The method of claim 1, wherein the active adsorptive nanocomposite is contacted with the first aqueous solution a temperature range of 20° C. to 30° C.

5. The method of claim 1, wherein the first aqueous solution comprises at least 100 ppm of toluene.

6. The method of claim 1, wherein the carbon nanotubes are multi-walled carbon nanotubes.

7. The method of claim 1, wherein the contacting removes at least 11% of the toluene from the first aqueous solution.

8. The method of claim 1, wherein the first aqueous solution has a pH range from 5-7.

* * * * *